United States Patent [19]
Norrie

[11] 3,834,562

[45] Sept. 10, 1974

[54] MOVABLE LOADING DOCK

[75] Inventor: Lyle W. Norrie, Etobicoke, Ontario, Canada

[73] Assignee: Swift & Company, Chicago, Ill.

[22] Filed: Aug. 22, 1973

[21] Appl. No.: 390,516

[52] U.S. Cl. ................. 214/38 BA, 14/71, 52/173, 214/85
[51] Int. Cl. .......................................... B65g 67/02
[58] Field of Search ............ 214/38 B, 38 BA, 38 D, 214/75 H, 86 R, 87, 88, 85; 52/173 DS; 14/71, 72; 280/150.5, 43.23

[56] References Cited
UNITED STATES PATENTS

| | | | |
|---|---|---|---|
| 1,783,363 | 12/1930 | Grob | 214/38 D |
| 2,688,761 | 9/1954 | Good | 214/38 B |
| 2,778,674 | 1/1957 | Attendu | 14/71 |
| 3,094,940 | 6/1963 | Learmont | 214/75 H |

*Primary Examiner*—Robert J. Spar
*Assistant Examiner*—G. L. Auton
*Attorney, Agent, or Firm*—Edward T. McCabe; Charles E. Bouton; W. C. Davis

[57] ABSTRACT

An intermediate vehicle useful as a loading dock in transferring goods between two transport vehicles comprises an enclosure mounted on wheels and having jacking means and equipped with dock boards and a system of overhead rails extendable from oppositely disposed openings for access to said transport vehicles.

7 Claims, 5 Drawing Figures

MOVABLE LOADING DOCK

This invention pertains to an improved movable loading dock for use with cargo vehicles, and more specifically is directed to an intermediate vehicle for use as a loading dock in transferring goods between two land transport cargo vehicles.

In the movement of goods and products between suppliers and consumers most items, at one stage or another, are transported in cargo vehicles. Often it is required that such items be transferred from one cargo vehicle to another. Also the items are almost always loaded onto, or unloaded from, such vehicles at handling facilities designed to accommodate specific types of vehicles. The use of railroad cars and highway trucks or lories is typical and illustrative. Large quantities of goods may be transported by rail quickly and economically. However, railroad cars are constrained to a system of rails and not all suppliers and/or consumers have direct access to the system of rails. Hence it is often required to transfer such items from trucks or lories onto railroad cars or out of the railroad cars onto trucks, etc.

Usually the transfer between trucks and railroad cars is undertaken at factory and warehouse facilities which have stationary loading docks adjacent to both railroad tracks and roadways. At such facilities, the items are offloaded from one vehicle onto the loading dock and then moved to another loading dock where they are loaded onto the other vehicle. Such docking facilities are relatively expensive and limited in number and location. Hence, they are not flexible in application and often do not provide for the least expensive combination of vehicle miles for transporting goods from one point to another. Additionally, the usual type permanent dock facility occupies a large area of real estate preventing the application of such property to other uses and involving permanent improvements to the real estate with consequent tax burdens.

A much more flexible and economic arrangement would be provided if loading dock facilities could be constructed economically and made portable so as to be available at the most efficient location for transferring items between vehicles. Accordingly, a portable loading dock facility that is not fixed to real property and that does not constitute an improvement to real property would effect a savings in cost of operation.

Also, permanent docking facilities are relatively inflexible with regard to vehicles, particularly trucks and lories, of different size and design. In this regard height above the roadway surface and the nature of loading apparatus are limiting factors. Hence, it would be of further advantage to have a loading dock of adjustable height and adaptable to various modes of loading and off-loading.

Accordingly, it is a principal object of the present invention to provide a transportable loading dock that can be moved to and from various locations and which is not limited to use in a fixed facility or upon fixed railways.

It is another object of the present invention to provide a loading dock that is adjustable to height and which can act as an intermediate stage between two transport vehicles at different elevations.

It is still another object of the present invention to provide a transportable loading dock that has some storage capacity whereby to permit an interchange of cargo vehicles while the flow of goods from or onto another vehicle may be continued without interruption and which will permit the reorganization of goods while being transferred between vehicles, and which can further be used as a transport vehicle in certain situations.

The present invention is adapted to overcome the foregoing disadvantages and obtain the stated objects by providing an improved intermediate vehicle for interposition, at remote locations, between two transport vehicles such as, but not limited to, railway cars and trucks. The intermediate vehicle includes an enclosure mounted upon a frame and a plurality of wheels adapted to be towed or otherwise moved. Jacking means are secured to the frame and are adjustable to raise the entire intermediate vehicle to a desired elevation. The enclosure is provided with openings at opposite sides thereof for communication with corresponding opening or doors in the respective transport vehicles; and hinged dock boards are provided at the enclosure floor level within each opening for bridging a distance to an adjacent transport vehicle. Additionally, each opening in the enclosure is provided with outwardly extending seal means to envelop the space between the intermediate vehicle and adjacent transport vehicles; and a system of overhead rails is mounted within the enclosure so as to be extendable through each opening and into adjacent transport vehicles.

Further objects and advantages of the present invention will become apparent upon reading the following detailed description in conjunction with the drawings wherein.

Figure 1:
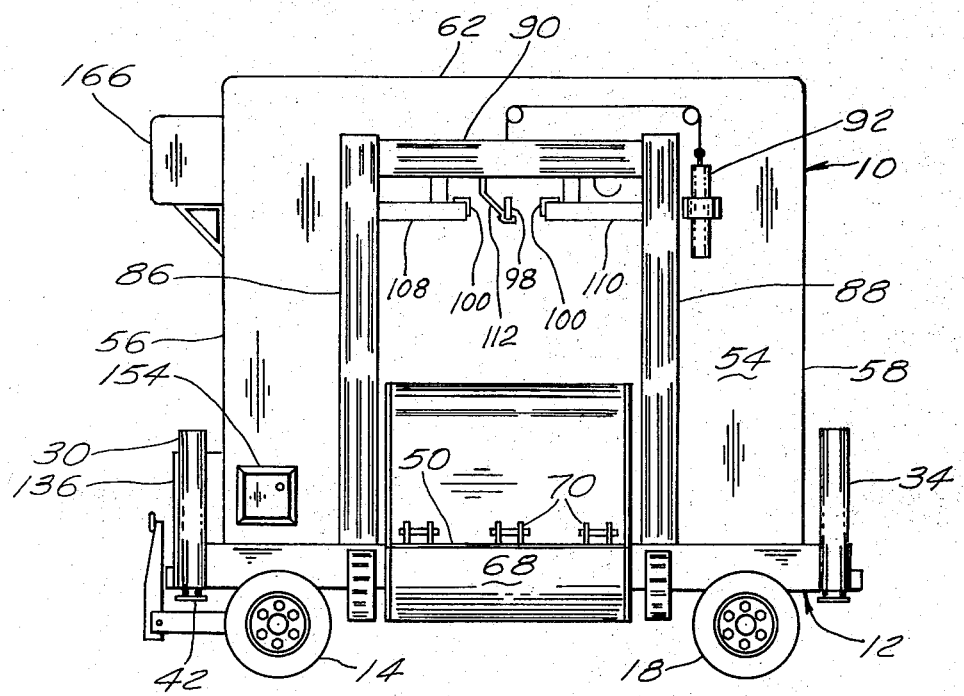
FIG. 1 is a side elevation of a preferred embodiment of an intermediate vehicle taken from a side adapted to service a roadway transport vehicle such as a truck or lorry.

The preferred embodiment of the invention shown in FIGS. 1–5 comprises an enclosure generally 10 mounted upon a rigid frame generally 12, which is in turn transportably supported on four rubber-tired wheels 14, 16, 18, and 20 that are rotatably mounted in pairs upon forward and rear axles 22, 24, respectively. A draw bar or towing bar 26 is preferably pivotally connected to the forward axle 22; and both axles 22, 24 are secured beneath the frame generally 12 by leaf springs 28.

Jacking means such as hydraulic jacks 30, 32, 34 and 36 are rigidly secured to the frame 12, as by welding or the like, at the corners thereof. For purposes of stability it is preferred that the jacks be mounted at the sides of the frame generally 12 and preferably at the forwardmost and rearmost points thereon so as to be spaced outwardly of the axles 20 and 22. Each hydraulic jack 30, 32, 34, and 36 comprises a cylinder 38 having an extendable leg 40 disposed downwardly, the latter terminating at its lowermost end in a foot pad 42. When the intermediate vehicle is positioned at a chosen location the extendable legs 40 of each hydraulic jack are lowered until the foot pads 42 are in forceful contact with the ground. Thereafter, the frame generally 12 and all components mounted thereon, including the enclosure generally 10 and all four wheels 14, 16, 18 and 20, may be lifted evenly by simultaneous operation of the four hydraulic jacks 30, 32, 34, and 36 in a manner well known to the art. The hydraulic jacks may also be operated independently to level the frame generally 12 or to align it with the plane of the floor of an adjacent vehicle, also in a manner well known in the art.

The enclosure generally 10 includes a floor 50 fastened to the frame generally 12, and four upstanding walls identified as a first side wall 52, a second side wall 54, a front end wall 56, and a rear end wall 58. According to the preferred embodiment shown in the FIGURES the first side wall 52 is designed to be positioned opposite and adjacent a railway car and has an opening therein that is approximately the size and shape of door openings normally provided in railway box cars. The second side wall 54 is designed to accommodate a truck or lorry or other roadway vehicle, and includes an opening therein of a size that will accommodate the usual rear door opening of a truck or trailer. Preferably a personnel access door 60 is located in the rear end wall 58. It is also preferred that the personnel access door 60 be hinged to open inwardly of the enclosure generally 10 and is located toward the second side wall 54. The enclosure generally 10 is also provided with a roof and ceiling structure 62.

Figure 2:
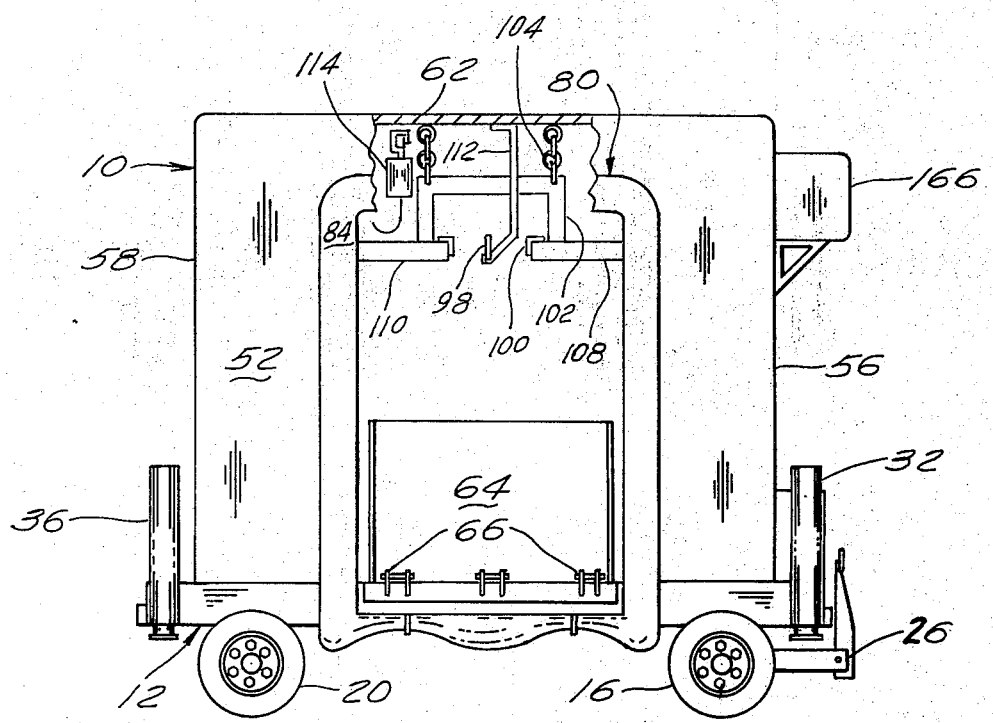
FIG. 2 is a side elevation of the preferred embodiment taken from the opposite side adapted to service a railway vehicle.
Figure 3:
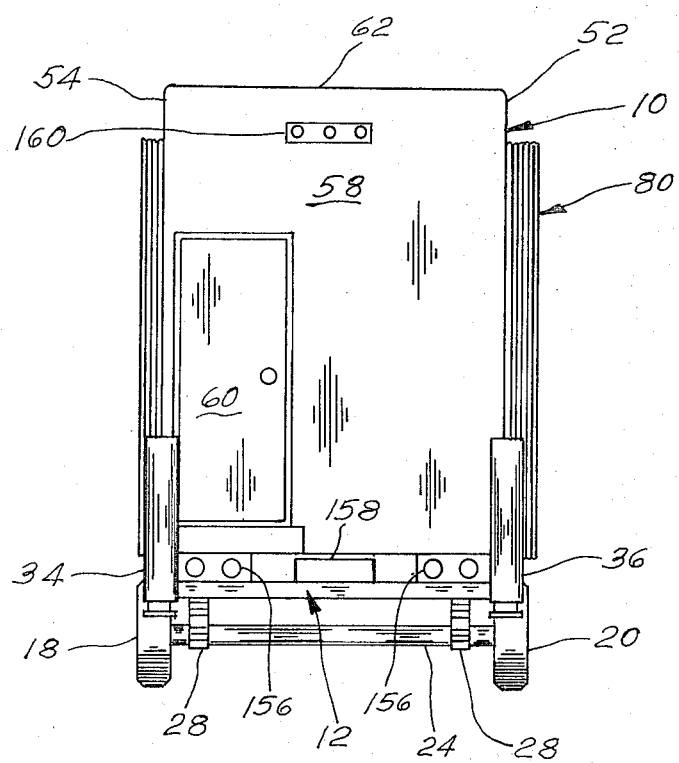
FIG. 3 is an end elevation showing the rear of the intermediate vehicle shown in FIGS. 1 and 2.
Figure 4:
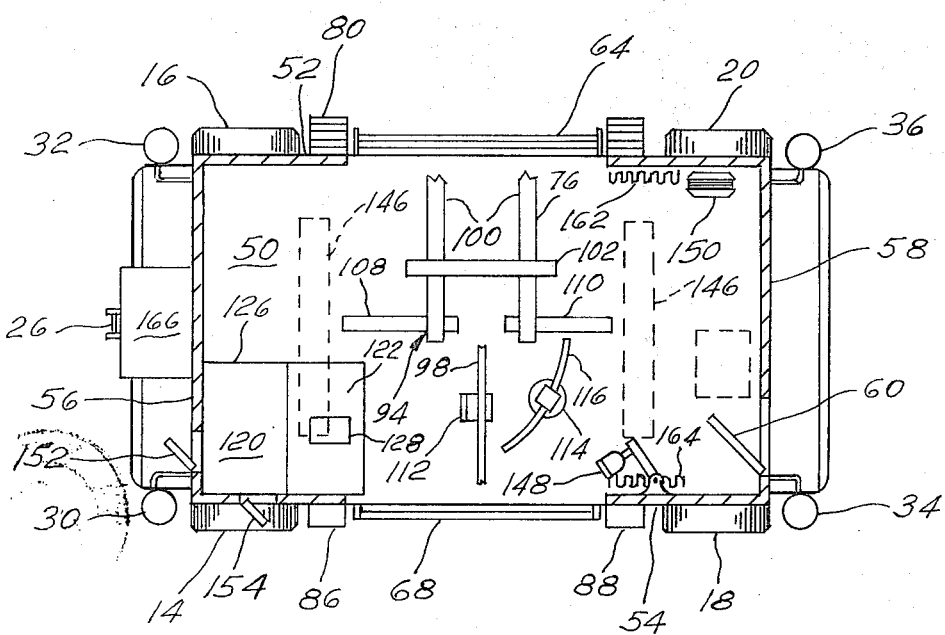
FIG. 4 is a plan view of the vehicle shown in FIGS. 1–3, with roof removed.
Figure 5:
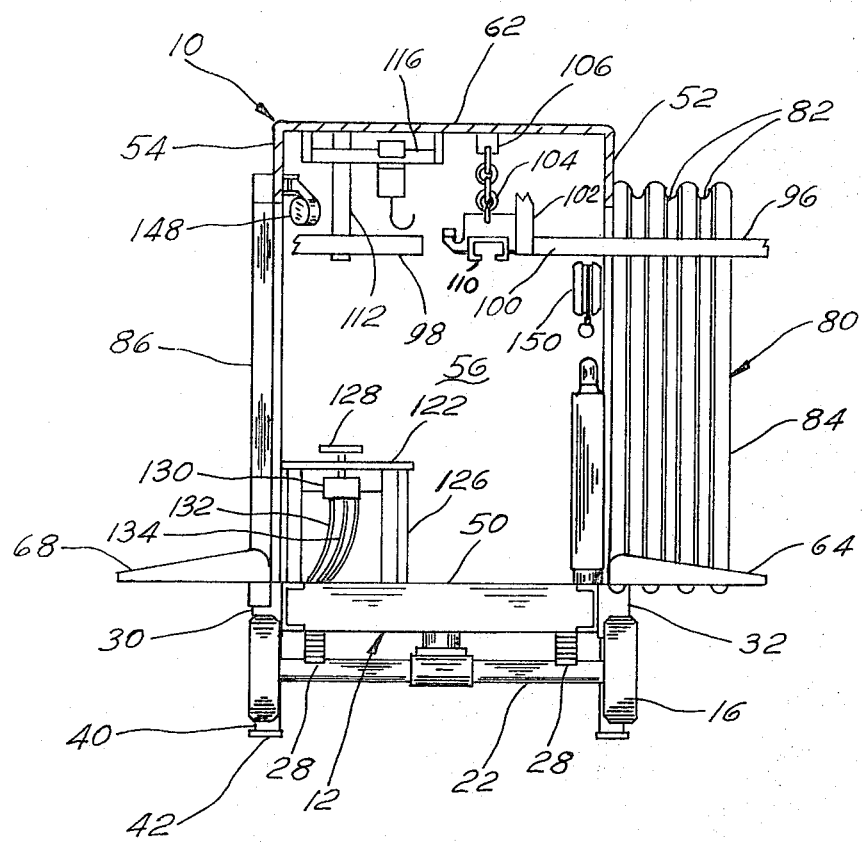
FIG. 5 is an end elevation, in section, of the intermediate vehicle shown in FIGS. 1–4, showing the interior thereof and the seal member extended at the railway side thereof.

A first dock board 64 is pivotally secured to the frame generally 12 by a plurality of hinges 66 at the opening in the first side wall 52. The first dock board 64 is normally pivoted upwardly, as shown in FIG. 2, when not in use. A second dock board 68 is pivotally secured to the frame generally 12 in a manner similar to dock board 64 with hinges 70 within the opening at the second side wall 54. The second dock board may be stored in an inoperative position pivoted upwardly as shown in FIG. 1. It may be seen in the drawing that the first dock board 64 is larger than the second dock board 68. The large size of the first dock board 64 is important because it is often difficult to maneuver the intermediate vehicle with respect to a railroad car and there are sometimes limits, such as curbs and the like, on the proximity to which the intermediate vehicle can be moved alongside a railway car. Hence, the first dock board 64 must be of sufficient dimension to bridge relatively greater distances as compared to the second dock board 68, where it is comparatively easier to maneuver a road vehicle into close proximity with the frame generally 12 of the intermediate vehicle.

For similar reasons the sealing means attached to the exterior of the first side wall 52 preferably comprises an extendable accordion type seal 80 having a plurality of pleats or folds 82 on an extendable frame (not shown), and having an engaging edge 84 which may be brought into abutment with a railway car. Preferably the accordion seal 80 completely encircles the opening in the first side wall 52 and is extendable outwardly a distance almost as far as the dimension of the first dock board 64. At the second side wall 54 an adequate sealing means may comprise a pair of cushion seals 86, 88 that are affixed to the exterior surface of the wall 54 adjacent the opening therein. The cushion seals 86, 88 should be flexible and have a substantial cross section, as viewed from above in FIG. 4, so as to accommodate the rear edges of truck side walls (not shown). Because it is possible to maneuver a truck into such close proximity it has not been found necessary to provide a seal beneath the opening in the second side wall 54; and it is sufficient to provide a simple overhead curtain 90 of canvas or the like, preferably counterbalanced by weight 92, which may be lowered onto the roof of a highway vehicle.

When the intermediate vehicle is disposed between two cargo transport vehicles, such as a railway car and a truck, with the respective first and second dock boards, 64, 68 extended outwardly to bridge the distance between the adjacent vehicles (and actually with the outer edges resting upon the floors of such vehicles), the floor 50 of the enclosure should be disposed at a level approximately equidistant between the levels of the floors of the adjacent vehicles. This can be adjusted by an operator manipulating the hydraulic jacks 30, 32, 34 and 36. In this position, cargo from one transport vehicle can be lugged, or rolled, or transported by dollies or the like across the dock boards 64, 68 and floor 50. However, in many applications, such as in the transfer of meat carcass goods and the like, it is desired to transfer the items by an overhead trolley. Many railway cars and highway trucks are provided with trolleys and overhead rail systems for supporting such items. Accordingly, it is preferred to include within the enclosure generally 10 and secured to the ceiling 62 an overhead rail system generally 94.

The overhead rail system generally 94 preferably comprises a first spur 96 compatible with the systems of railway cars, and trolleys used therein; and a second spur 98 compatible with the systems used in highway vehicles and the like. The first spur 96 may include parallel rails 100 secured by one or more suspension spacing brackets 102 which are flexibly suspended by chains 104 or the like from a reinforced crossbeam 106 fastened to the ceiling 62. The first and second spurs 96, 98 extend oppositely from adjacent points located centrally of the enclosure 10, through the respective openings in walls 52 and 54. Preferably a pair of wing storage rails 108 and 110 extend perpendicular to the first spur 96 adjacent the suspension bracket 102 and may also be flexibly suspended by chains and the like from the crossbeam 106. This type of suspension permits great latitude when parking the movable loading dock as exact alignment of the first spur 96 with a railway car spur is not necessary. The second spur 98 usually comprises a single rail suspended from the ceiling 62 by hangers 112. Also included is a hoist 114, movably supported from an arcuate track 116 adjacent said first and second spurs, which assists the operator in transferring heavy items from one spur to another.

The foregoing overhead rail system generally 94 permits the movable loading dock to be used alternately to either pass items directly therethrough from one vehicle to another without change, or to temporarily store a few items so that the arrangement of same may be manipulated respecting the vehicle to which they are transferred, or also to process to some degree the items when they enter the enclosure, generally 10, of the movable loading dock. For instance when full or half carcasses are being removed from one vehicle they may be further subdivided to quarters while suspended from the overhead rail system generally 94 and then moved onto the receiving vehicle.

Within the enclosure generally 10 an elevated operator platform 120 is provided. Preferably, this platform is located at a forward corner of the enclosure adjacent the second side wall 54. It may be conveniently provided with a hinged extension 122 pivotally secured to a bracket 124 adjacent the top of the platform 120. This serves two functions. It provides an elevated position of safety for an attendant out of the way of goods that may be dropped or otherwise mishandled on the floor 50 of the enclosure generally 10. Also, from the extension 122, an attendant may easily reach and service the overhead rail system generally 100. Also the platform 120 is the upper surface of an engine and pump compartment 126 within which the mechanism for driving the hydraulic jacks 30, 32, 34, 36 is located. A foot control pedal 128 may be mounted upon the hinged extension 122 and a control valve 130 mounted thereunder. The control valve 130 is connected by hydraulic lines 132, 134, etc. to the pump (not shown), the hydraulic jacks and a hydraulic reservoir 136 mounted on the frame generally 12 forwardly of the enclosure generally 10. The hydraulic system engine, generator, and pump (not shown) are of a form and design well understood in the art.

The preferred embodiment of the invention may also be provided with additional auxiliary equipment. Overhead fluorescent lamps 146 (shown in phantom and FIG. 4) may be located in the ceiling 62 and powered by the generator or the like (not shown). One or more electric lamps 148 may be swingably mounted to the interior of the side walls 52, 54 for illuminating the interior of adjacent cargo vehicles. Similarly, a real type lamp generally 150 with extendable cord and light may be mounted within the enclosure generally 10. For purpose of cooling and servicing the engine compartment 126 access doors 152 and 154 are provided in the front end wall 56 and second side wall 54.

Also, since it is contemplated that the intermediate vehicle may be towed on streets and highways, it is provided with exterior brake and signal lamps 156 at the rear end of the frame generally 12. Similarly a license plate lamp 158 should be provided; and a number of running lights 160 should be mounted at visible areas of the intermediate vehicle.

Additional optional equipment may include curtains 162 and 164 mounted along the first and second side walls 52 and 54 within the enclosure 10 for closing the openings therein. Finally, where desired, a refrigeration unit 166 may be mounted outside the enclosure generally 10, for instance on the front end wall 56, where it is desired that the intermediate vehicle is to be independently cooled.

Obviously many modifications and variations of the invention as hereinbefore set forth may be made without departing from the spirit and scope thereof, and, therefore, only such limitations should be imposed as are indicated in the appended claims.

I claim:

1. An improved intermediate vehicle for interposition between two cargo transport vehicles, such as a railway car and a highway truck, to facilitate transfer of goods between said cargo transport vehicles, said intermediate vehicle including a frame supported upon four wheels, said improvement comprising: a plurality of jacking means secured to said frame, said jacking means being independent of one another and extendable from an inoperative withdrawn position into contact with the ground and further extended to vertically lift said frame and wheels above the ground; an enclosure mounted upon said frame, said enclosure having first and second openings in opposite walls thereof; a first dock board hinged to said frame in said first opening, said first dock board being movable so as to bridge a distance between an immobile railway car and said intermediate vehicle when the latter is parked along said railway car; a second dock board hinged to said frame in said second opening, said second dock board being movable so as to bridge a distance between said intermediate vehicle and a truck when the latter is positioned closely adjacent said intermediate vehicle; an accordion seal secured to said enclosure around the exterior of said first opening, said accordion seal being extendable to encompass a cargo doorway in an adjacent railway car; a pair of cushioned seals vertically secured alongside the exterior of said second opening; a counter-weighted vertical curtain secured to the exterior of said enclosure above said second opening; and a system of overhead rails within said enclosure, said rails being extendable outwardly through said first and second openings to adjacent railway car and truck for transfer of goods therebetween, and extending within said enclosure for temporary storage of goods therein.

2. The improved intermediate vehicle of claim 1 wherein said jacking means comprises four jacks located at each corner of said frame adjacent each wheel.

3. The improved intermediate vehicle of claim 1 wherein said system of overhead rails includes a first spur compatible with an overhead rail system of a railway car; a second spur compatible with an overhead rail system of a highway vehicle, said first and second spurs extending from adjacent points located centrally of said enclosure.

4. The improved intermediate vehicle of claim 3 wherein a pair of wing storage rails extend perpendicular of said first spur within said enclosure.

5. The improved intermediate vehicle of claim 3 wherein said first spur is flexibly suspended from the ceiling of said enclosure whereby to provide latitude in aligning said first spur with an overhead rail system in an adjacent railway car.

6. The improved intermediate vehicle of claim 3 including a hoist means movably located adjacent said first and second spurs.

7. The improved intermediate vehicle of claim 1 including means to light the enclosure and power the jacking means thereof.

* * * * *